United States Patent
Hahn et al.

(10) Patent No.: US 7,741,236 B2
(45) Date of Patent: Jun. 22, 2010

(54) WATER-SOLUBLE GLASS COMPOSITION

(75) Inventors: Karlheinz Ulrich Gerhard Hahn, Ludwigshafen (DE); Karin Werner, Ludwigshafen (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 12/474,521

(22) Filed: May 29, 2009

(65) Prior Publication Data

US 2009/0239731 A1 Sep. 24, 2009

Related U.S. Application Data

(63) Continuation of application No. 10/575,219, filed on Jun. 2, 2006, now abandoned.

(51) Int. Cl.
*C03C 3/21* (2006.01)
*C11D 3/04* (2006.01)
*C11D 3/06* (2006.01)
*C23F 11/00* (2006.01)
*B08B 9/00* (2006.01)

(52) U.S. Cl. .............................. 501/46; 501/45; 501/47; 501/48; 501/49; 501/73; 134/25.1; 134/25.2; 252/387

(58) Field of Classification Search ................. 510/227; 501/46
See application file for complete search history.

(56) References Cited

U.S. PATENT DOCUMENTS

| | | | | |
|---|---|---|---|---|
| 3,255,117 | A * | 6/1966 | Knapp et al. ............... | 510/227 |
| 3,677,820 | A * | 7/1972 | Rutkowski ................ | 134/25.2 |
| 4,443,270 | A * | 4/1984 | Biard et al. ............... | 134/25.2 |
| 6,582,507 | B1 * | 6/2003 | Cao et al. ................. | 106/479 |
| 6,622,736 | B1 * | 9/2003 | Hahn ........................ | 134/25.2 |
| 6,806,245 | B2 * | 10/2004 | Hahn ........................ | 510/220 |
| 7,179,776 | B2 * | 2/2007 | Hahn ........................ | 510/232 |
| 7,361,632 | B2 * | 4/2008 | Hahn ........................ | 510/227 |
| 7,396,786 | B2 * | 7/2008 | Miyata et al. ............. | 501/45 |
| 7,456,142 | B2 * | 11/2008 | Hahn ........................ | 510/227 |
| 7,482,293 | B2 * | 1/2009 | Tsai et al. ................ | 501/46 |
| 7,528,084 | B2 * | 5/2009 | Emlemdi .................. | 501/73 |
| 7,531,474 | B2 * | 5/2009 | Shiraishi .................. | 501/46 |
| 7,553,785 | B2 * | 6/2009 | Ritter et al. ............... | 501/46 |
| 2003/0052299 | A1 * | 3/2003 | Umeda et al. ............ | 252/62.6 |
| 2003/0220182 | A1 * | 11/2003 | Izuki ........................ | 501/46 |
| 2004/0018933 | A1 * | 1/2004 | Ogino et al. ............. | 501/45 |
| 2004/0138043 | A1 * | 7/2004 | Kasuga et al. ............ | 501/45 |
| 2004/0176236 | A1 * | 9/2004 | Hayden et al. ............ | 501/46 |
| 2005/0090417 | A1 * | 4/2005 | Hahn ........................ | 510/220 |
| 2005/0192174 | A1 * | 9/2005 | Yamamoto et al. ........ | 501/45 |
| 2005/0233888 | A1 * | 10/2005 | Seneschal et al. ......... | 501/45 |
| 2006/0058171 | A1 * | 3/2006 | Izuki ........................ | 501/47 |
| 2006/0128549 | A1 * | 6/2006 | Hormadaly ............... | 501/45 |
| 2008/0032879 | A1 * | 2/2008 | Tsai et al. ................ | 501/42 |

FOREIGN PATENT DOCUMENTS

| | | | |
|---|---|---|---|
| BE | 860 180 A2 * | 4/1978 |
| EP | 0 070 587 A1 * | 1/1983 |
| EP | 0 383 480 A1 * | 8/1990 |
| EP | 0 383 482 A1 * | 8/1990 |
| EP | 0 387 997 A1 * | 9/1990 |
| EP | 1 493 720 A * | 1/2005 |
| GB | 1 586 067 A * | 3/1981 |
| GB | 2 309 032 A * | 7/1997 |
| GB | 2 361 708 A * | 10/2001 |
| GB | 2 372 500 A * | 8/2002 |
| WO | WO 96/36687 A * | 11/1996 |
| WO | WO 00/39259 A * | 7/2000 |
| WO | WO 01/64823 A * | 9/2001 |
| WO | WO 2004/106476 A * | 12/2004 |

OTHER PUBLICATIONS

International Search Report dated Feb. 9, 2005 for application PCT/GB2004/004414.*
Combined Search and Examination report from the Patent Office in Great Britian dated Mar. 19, 2004 for application GB 0324295.5.*
Combined Search and Examination report from the Patent Office in Great Britian dated Aug. 9, 2004 for application GB 0404469.9.*
Combined Search and Examination report from the Patent Office in Great Britian dated Sep. 30, 2004 for application GB 0404470.7.*

* cited by examiner

*Primary Examiner*—Joseph D Anthony
(74) *Attorney, Agent, or Firm*—Norris, McLaughlin & Marcus

(57) ABSTRACT

A zinc and bismuth containing, water-soluble glass composition comprising from 10 to 75 mole % $P_2O_5$, 5-50 mole % alkali metal oxide, up to 40 mole % ZnO and up to 40 mole % $Bi_2O_3$.

15 Claims, No Drawings

WATER-SOLUBLE GLASS COMPOSITION

This application is a Continuation Application of Ser. No. 10/575,219 filed Jun. 2, 2006, which is a 35 USC 371 application of PCT/GB2004/004414 filed Oct. 18, 2004, which claims priority to the Great Britain application GB 0324295.9 filed Oct. 17, 2003, Great Britain Application 0404469.9 filed Feb. 28, 2004 and Great Britain Application 0404470.7 filed Mar. 1, 2004.

The present invention relates to a water-soluble glass composition comprising zinc and bismuth for use in the protection of glassware in an automatic dishwasher process.

The problem of glassware corrosion in automatic dishwasher processes is well recognized. It has been put forward that the problem of glassware corrosion is the result of two separate phenomena. Firstly, it is suggested that the corrosion is due to leakage of minerals from the glass network, accompanied by hydrolysis of the silicate network. Secondly, silicate material is suggested to be released from the glass.

These phenomena can cause damage to glassware after a number of separate wash cycles. The damage may include cloudiness, scratches, streaks and other discoloration/detrimental effects.

Silicate materials have been suggested to be effective in preventing materials from being released by the glass composition. However, the use of silicate compounds can have detrimental side effects, such as the tendency to increase separation of silicate material at the glass surface.

A further solution has been to use zinc, either in metallic form (such as described in U.S. Pat. No. 3,677,820) or in the form of compounds. The use of soluble zinc compounds in the prevention of glassware corrosion in a dishwasher is described in, for example, U.S. Pat. No. 3,255,117.

There are disadvantages connected with the use of soluble zinc salts, in particular formation of precipitates of insoluble zinc salts with other ions in the wash liquor or rinse water. Thus, the use of insoluble zinc compounds for the inhibition of corrosion of glassware in automatic dishwashing processes has been proposed (e.g. in European Patent Application EP 0 383 480 A1, EP 0 383 482 A1 and EP 0 387 997 A1). Insoluble zinc salts such as zinc silicate, zinc carbonate, zinc oxide, basic zinc carbonate, zinc hydroxide, zinc oxalate, zinc monophosphate and zinc pyrophosphate have been proposed.

However, with these compositions due to the low solubility of the zinc compounds, it is difficult to ensure that a sufficient amount of active corrosion inhibiting agent enters the wash liquor or rinse water. Moreover, due to the high specific density of above mentioned insoluble zinc salts, separation problems of powder mixtures or deposition problems with liquid mixtures have occurred.

The use of glasses and ceramics containing zinc has been found to address the problem of glassware corrosion in a dishwasher. WO-A-01/64823 describes the use of a ceramic composition comprising zinc to protect glassware in an automatic dishwashing process. GB-A-2 372 500 and WO-A-00/39259 describe the use of a soluble glass composition comprising zinc (present in the form of ions) to protect glassware in an automatic dishwashing process. The use of a ceramic/glass zinc containing composition overcomes the problems of poor solubility/precipitation described above whilst offering effective glassware protection.

However, there is still a problem associated with the ceramic/glass zinc containing compositions (and also with water soluble/insoluble zinc compounds) in that these compositions do not perform satisfactorily in the prevention of decorated glassware corrosion.

Bismuth has been used as an additive to aid the prevention of corrosion of glazed glassware corrosion. For example, BE 860180 describes the use of bismuth to avoid damage of decorated, glazed articles. However, the value of bismuth in this purpose has been diminished by the detrimental effects that the use of bismuth compound has on other components of the washing process. In this regard bismuth has been found to stain plastic materials (such as Tupperware®). Bismuth also causes the formation of a brown stain on non-decorated glassware and cutlery. Also although the glazed portion of the glassware may receive protection, bismuth has been found to stain the non-glazed portions. For these reasons the use of bismuth as a glaze protector has been avoided.

A further problem which may be encountered when washing glassware in a dishwasher, and which has as yet not been addressed by automatic dishwasher detergent manufactures, is that caused by the presence of aluminium ions in the dishwasher.

In the past aluminium has been put forward as a glass corrosion inhibition agent in, for example, U.S. Pat. No. 3,255,117 and WO-A-96/36687, for fine tableware such as lead crystal.

However, there is some doubt that aluminium is entirely effective in this aim: whilst a reduction in mass loss and cord lines, when the glass is washed repeatedly in an automatic dishwasher is observed, glass clouding is exacerbated.

Additionally, a major problem with the use of aluminium is that, with use, the glassware adopts an iridescence. This has the effect of changing the glass from being transparent and colourless to having a coloured hue. Indeed, it has been observed that the detrimental efficacy of aluminium in this regard is so high that even when aluminium is present in a very small amount in the dishwasher liquor this effect is observed. As an example, the use of aluminium based dyes in dishwasher detergents, even in the minuscule quantities that such dyes are required, is avoided so that the iridescence effect does not occur.

Clearly this detrimental effect on glassware is undesirable. As a result the presence of aluminium in automatic dishwashing detergents has had to be avoided. However, although the aluminium content of a detergent (and also the automatic dishwashing machine) can be controlled and is usually kept as low as possible, the action of a consumer can still lead to exposure of glassware to aluminium. This can happen if, for example, a user washes an aluminium item (such as a common household garlic press) in an automatic dishwasher. In this instance the release of aluminium into the dishwasher liquor is enough to cause the detrimental effects described above. This effect may even be apparent after the single wash cycle the effect has also been observed if the user washes other aluminium items such as some pre-prepared food containers in the dishwasher. The effect may also be caused if the dishwasher contains any exposed aluminium components such as screws or sieves.

The problem of metallic aluminium dissolution leading to the iridescent issues is particularly pronounced in a dishwashing machine as the dishwasher liquor is normally alkaline and aluminium dissolution enhanced at high pH.

A further detrimental effect associated with the use of aluminium is that aluminium is known to exacerbate glass clouding corrosion. This is in contrast to the positive effect of aluminium on mass loss and cord lines. Clearly this detrimental effect prevails over any positive effect and is to be avoided.

It is an object of the present invention to obviate/mitigate the problems outlined above.

According to a first aspect of the present invention there is provided a zinc and bismuth containing, water-soluble glass composition comprising from 10 to 75 mole % $P_2O_5$, 5-50 mole % alkali metal oxide, up to 40 mole % ZnO and up to 40 mole % $Bi_2O_3$.

The composition has been found to be highly effective at protecting glassware from corrosion in an automatic dishwasher. Also the composition has been found to be highly effective in protecting glazed glassware/crockery in the same application.

Additionally the combination of zinc and bismuth has especially beneficial properties in the prevention of detrimental effects (such as iridescence) caused by the presence of aluminium in the dishwasher liquor in an automatic dishwashing process.

Thus now a single composition may be used to address the issues of non-decorated glassware corrosion, decorated glassware corrosion and detrimental issues caused by the presence of aluminium.

In the present invention it is understood that the term glassware includes items made of glass (such as drinking glasses and plates) which may be decorated (such as with a glaze and/or with etching/glass addition). The term glassware is also understood to include other items of houseware, which may comprise a material other than glass (such as a ceramic) but which have a glass/glaze coating or decoration (such as a glazed ceramic plate).

The mole ratio of zinc to bismuth in the composition is preferably in the range from 1:100 to 100:1 more preferably from 1:50 to 50:1, more preferably from 1:25 to 25:1 and most preferably from 1:20 to 20:1. Within these ratios it has been found that dissolution of the glass proceeds cleanly without residue formation.

Generally the glass composition comprises up to 35 mole %, more preferably up to 30 mole %, more preferably up to 25 mole % and most preferably up to around 20 mole % zinc oxide (ZnO). Usually the glass composition comprises more than 5 mole %, more preferably more than 10 mole % and most preferably more than 17 mole % of zinc oxide.

Generally the glass composition comprises up to 10 mole %, more preferably up to 5 mole %, more preferably up to 3 mole % and most preferably up to around 1.5 mole % bismuth oxide ($Bi_2O_3$). Usually the glass composition comprises more than 0.1 mole %, more preferably more than 0.3 mole % and most preferably more than 0.5 mole % of bismuth oxide. Most preferably the glass comprises about 1 mole % of bismuth oxide.

Bearing the ratios outlined above in mind, the amount of zinc and bismuth provided to a dishwasher cycle is preferably from 1 to 1000 mg, more preferably from 1 to 500 mg, more preferably from 1 to 200 mg and more preferably 5 to 100 mg. Preferably this weight refers to the combined weight of both metals.

Most preferably the zinc and bismuth are available as ions in the dishwasher washing liquor.

Generally the glass composition comprises up to 40 mole %, more preferably up to 35% and most preferably up to 30% of an alkali metal oxide (suitably one or more of $Li_2O$, $Na_2O$, $K_2O$). Usually the glass composition comprises more than 10 mole %, more preferably more than 15 mole % and most preferably more than 20 mole % of an alkali metal oxide. Most preferably the glass comprises about 25 mole % of an alkali metal oxide.

Preferably, the glass comprises an alkaline earth oxide. Where present, the amount of alkaline-earth oxide is preferably less than 10 mole %, more preferably less than 5 mole % and, most preferably less than 3 mole %.

A preferred example of an alkaline earth oxide is calcium oxide (CaO).

Preferably the composition comprises a refining agent. Refining agents are well known in glass manufacturing as agents which aid gas bubble dissipation and unfavourable reduction/oxidation reactions occurring within the glass. Where present the refining agent generally comprises less than 10 mole % and more preferably less than 5 mole % of the composition Preferred examples of refining agents include sulphates/oxides or antimony, arsenic, cerium, manganese or an admixture thereof.

Preferably the composition comprises an oxide of an element from the group consisting of silicon, germanium, tin and lead. The amount of this oxide is preferably less than 10 mole %, more preferably less than 5 mole % and most preferably less than 3 mole %.

With the use of one of these oxides, especially silicon, in the amounts discussed in the above paragraph it has been found that the solubility of the glass composition can be adjusted.

The composition may comprise an oxide of gallium, aluminium or boron. The use of an oxide of one of these elements has been found to reduce the humidity corrosion susceptibility of the glass surface. Where present, the amount of such oxide is preferably from 0.1 to 10 mole %, more preferably from 0.2 to 5 mole %, and most preferably from 0.3 to 3 mole %.

The presently most preferred composition according to the invention consists of from 41 to 54 mole % of $P_2O_5$, from 20 to 30 mole % of alkali oxides, up to 5 mole % of $SO_3$, from 15 to 25 mole % of ZnO, from 0.2 to 1.5 mole % $Bi_2O_3$, less than 3 mole % of alkaline-earth oxides, and from 0.3 to 3 mole % of oxides of elements selected from the group consisting of silicon, aluminium and boron.

The composition is preferably in the form of a shaped body. The body is preferably manufactured in a continuous glass manufacturing process such as casting, pressing or blowing.

The preferred weight of the body is from 10-100 g, most preferably in the range of from 20-40 g.

Alternatively, the composition may be in a comminuted form. This form may be manufactured by breaking of thin glass plates or by milling, When milled or broken, the milled glass most preferably has an average particle size of less than 500 microns.

Generally the glass processing temperature is in the range of 600-900° C. glass temperature with the overlying air temperature in the range of 900-1200° C. Within this range any problems caused by the decomposition of the glass components (particularly bismuth oxide to metallic bismuth) air mimised. Most preferably the glass processing temperature is in the range of 620-720° C. with the overlying air temperature in the range of 1000-1100° C.

The glass is intended for use in an automatic dishwasher for the inhibition of corrosion of glassware.

Thus in accordance with a second aspect of the invention there is provided the use of a zinc and bismuth containing, water-soluble glass composition comprising from 10 to 75 mole % $P_2O_5$, 5-50 mole % alkali metal oxide, up to 40 mole % ZnO and up to 40 mole % $Bi_2O_3$ for inhibition of corrosion of glassware in an automatic dishwashing machine.

Surprisingly, only the specific selection of components in their indicated ranges simultaneously fulfils the requirements of releasing zinc and bismuth during the dishwashing cycles in an amount enough to ensure glassware corrosion protection, providing for a dissolution rate of the glass enabling to use a block of reasonable weight for a reasonable number of washing cycles (for example, 60 cycles).

The glass has also been found to reduce the detrimental effects on glass or caused by the presence of aluminium in dishwasher liquor.

It will be appreciated that features of the first aspect of the invention shall apply mutatis mutandis to the second aspect of the invention.

The glass composition may be used with any conventional automatic dishwashing detergent formulation (such as tablets, powders, liquids or gel).

Most preferably the glass is retained in a cage in use. The cage preferably has an aperture to permit contact between the wash liquor and the glass. Generally the cage has a retaining means (such as a hook) for reversible attachment to a dishwasher element.

The invention is now further described with reference to the following non-limiting Examples.

EXAMPLES

Composition Examples

The following glass compostions (as shown in Table CO1) were processed, in 20 kg batches, at a melting temperature is in the range of 600-900° C. glass temperature in a gas heated crucible furnace. The overlying air temperature was in the range of 900-1200° C.

TABLE CO1

| | Glass Composition (Mole %) | |
|---|---|---|
| Component | Example 1 | Example 2 |
| $P_2O_5$ | 53 | 50 |
| $Na_2O$ | 0 | 0.5 |
| $K_2O$ | 25.5 | 25.4 |
| $Bi_2O_3$ | 1 | 0.25 |
| $B_2O_3$ | 0 | 0.5 |
| MnO | 0 | 0.1 |
| CaO | 1.7 | 2.25 |
| SrO | 0 | 0 |
| $Al_2O_3$ | 0.8 | 0 |
| $SiO_2$ | 0 | 1 |
| ZnO | 18 | 20 |
| Refining Agent (0.1 mole %) | $SO_4^{2-}$ | $MnO_2$ |

Both compositions were found to be completely dissolvable, with no white layer formation on the glass surface after multiple cycles inside the dishwasher.

The composition of Example 1 was colourless at a melting temperature of 800° C., turning yellow at 900° C. and yellow dark brown at 1050° C.

The composition of Example 2 was colourless at a melting temperature of 800° C., also at 900° C. and even at 1050° C.

Process Examples

In the Examples the following detergent composition (as shown in Table PR1a) was used as a detergent formulation base. The formulation was used in tablet form.

TABLE PR1a

| Component | % |
|---|---|
| Sodium Tripolyphosphate | 45.0 |
| Sodium Disilicate | 3.5 |
| Sodium Bicarbonate | 2.0 |
| Sodium Carbonate | 18.5 |
| Sodium Perborate | 10.0 |

TABLE PR1a-continued

| Component | % |
|---|---|
| TAED | 2.5 |
| Protease | 1.5 |
| Amylase | 0.5 |
| Non-ionic Surfactant | 3.5 |
| Polyethylene-glycol | 7.5 |
| Perfume + Dye | 0.3 |
| Auxiliaries | Rest |

Test Method

In the Examples test glasses were washed 50 to 100 times in a special endurance test dishwasher (Miele G 541 Special).

Cleaning Dosage: A 20 g tablet of the base detergent described above was used with alternative additives (as specified in the Examples). Automatic dosing of the tablet occurred at the beginning of the cleaning cycle.

Water Hardness in the machine: less than 0.5dGH, central softening through ion exchangers, internal ion exchangers not in operation.

Cleaning program 65° C. (both the cleaning and the rinse cycle were operated at 65° C.).

Water consumption per cycle: 23.5 liters.

There was no soiling of the glassware tested.

The test report comprised the following types of glass:

Clear Glasses
  Luigi Bormoli (Italy):
    "linea Michelangelo David" C32 Whitewine glass 19 cl.
  Arc-International (France):
    "Luminarc Octime Transparent", Whisky glass 30 cl.
    "Longchamp", 17 cl, Stemglass, lead crystal glass.
    "Arcoroc Elegance", Wineglass, 14.5 cl.
  Ruhr Kristall Glas (Germany):
    "Kölner Stange", 24 cl, beer glass.
    "RKG Bier", Beer Stemware, 38 cl.
  Nachtmann Bleikristallwerke (Germany):
    "Longdrink-glass", special edition (dishwasher sensitive), produced especially for Reckitt Benckiser.

Decorated Glassware
  Ruhr Kristall Glas (Germany):
    "Snoopy Look In", Longdrink Nordland 28 cl.
    "Teddy", Primusbecher 16 cl.
  Arc-International (France):
    "Kenia", dinner plate, 19.5 cm.

The weight loss was determined gravimetrically after 50 to 100 test washes. Visible changes to the glass surface were evaluated in natural light (iridescence) or in a special light box (glass clouding, line corrosion and decoration damage). The dimensions of the light box were 70 cm×40 cm×65 cm (l×b×h) and the inside of the box was painted matt black. The box was lit from above with an L 20 w/25 S (60 cm long) Osram lamp, which was covered in front with a screen. Shelves were disposed in the box on which the glasses were placed for evaluation. The box was open at the front.

The glass corrosion was evaluated using the following criteria; glass clouding (GC), line corrosion (CL), decoration damage (DS) and iridescence (IR). For each parameter a score was given in accordance with the table below.

| Evaluation | Damage Impact |
|---|---|
| 0 | No glass damage |
| 1 | First minor damage/hardly visible |
| 2 | Slight damage, visible to expert or in the light box |
| 3 | Visible damage |
| 4 | Strong damage, clearly visible |

Comparative Process Example 1

In this Comparative Example only the base detergent formulation was used.

The results of the tests are shown in Table PR2a (Glass Corrosion) and Table PR2b (Mass Loss).

TABLE PR2a

| | Glass Corrosion | | | | | |
|---|---|---|---|---|---|---|
| | 50 cycles | | | 100 Cycles | | |
| Glasses | GC | CL | IR | GC | CL | IR |
| Michelangelo | 2.5 | 3.0 | 0.0 | 2.5 | 4.0 | 0.0 |
| Octime | 1.0 | 3.0 | 0.0 | 2.0 | 4.0 | 0.0 |
| Longchamp | 3.5 | 3.0 | 0.0 | 4.0 | 4.0 | 0.0 |
| RKG Kölsch | 0.5 | 3.0 | 0.0 | 1.0 | 4.0 | 0.0 |
| RKG Bier | 2.5 | 3.5 | 0.0 | 3.0 | 4.0 | 0.0 |
| Nachtmann Longdrink | 3.0 | 0.0 | 0.0 | 4.0 | 0.0 | 0.0 |
| Arcoroc Elegance | 3.0 | 3.5 | 0.0 | 4.0 | 4.0 | 0.0 |
| Average | 2.29 | 2.71 | 0.0 | 2.93 | 3.43 | 0.0 |

| Decorated Glassware | DS | IR | DS | IR |
|---|---|---|---|---|
| Snoopy | 3.0 | — | 3.5 | — |
| Teddy | 3.5 | — | 4.0 | — |
| Kenia Plates | 3.5 | 0.0 | 4.0 | 0.0 |
| Average | 3.33 | — | 3.83 | — |

TABLE PR2b

| | Mass Loss | |
|---|---|---|
| | 50 cycles Mass Loss (mg) | 100 cycles Mass Loss (mg) |
| Glasses | | |
| Michelangelo | 35 | 59 |
| Octime | 25 | 48 |
| Longchamp | 58 | 94 |
| RKG Kölsch | 24.5 | 45.5 |
| RKG Bier | 40 | 72 |
| Nachtmann Longdrink | 70 | 124 |
| Arcoroc Elegance | 17 | 30 |
| Sum | 269.5 | 472.5 |
| Decorated Glassware | | |
| Snoopy | 223 | 502 |
| Teddy | 67 | 145 |
| Kenia Plates | 110 | 230 |
| Sum | 400 | 877 |

Comparative Process Example 2

In this Example the following glass composition was used as a source of zinc only (as shown in Table PR3a) in addition to the base detergent tablet. The glass formulation used was in the form of a solid body (measuring 4 cm×1 cm×1 cm).

TABLE PR3a

| Component | Mole % |
|---|---|
| $P_2O_5$ | 50.0 |
| $Na_2O$ | 1 |
| $K_2O$ | 26 |
| $B_2O_3$ | 1 |
| CaO | 2.0 |
| $SiO_2$ | 2.0 |
| ZnO | 18 (14.5% Zn) |

When used in accordance with the method described the mass loss of the glass block was on average 0.6 g/cycle, equating to about $60 Zn^{2+}$ per cycle.

The results of the tests are shown in Table PR3b (Glass Corrosion) and Table PR3c (Mass Loss).

TABLE PR3b

| | Glass Corrosion | | | |
|---|---|---|---|---|
| | 50 cycles | | 100 Cycles | |
| Glasses | GC | CL | GC | CL |
| Michelangelo | 1.0 | 1.0 | 1.5 | 1.5 |
| Octime | 1.5 | 2.5 | 2.0 | 2.5 |
| Longchamp | 0.5 | 1.0 | 1.5 | 1.5 |
| RKG Kölsch | 0.0 | 1.5 | 1.0 | 1.5 |
| RKG Bier | 1.5 | 1.5 | 2.5 | 2.0 |
| Nachtmann Longdrink | 2.0 | 0.0 | 2.5 | 0.0 |
| Arcoroc Elegance | 1.5 | 1.5 | 2.5 | 2.0 |
| Average | 1.1 | 1.3 | 1.9 | 1.6 |

| Decorated Glassware | DS | DS |
|---|---|---|
| Snoopy | 1.5 | 2.5 |
| Teddy | 1.5 | 2.5 |
| Kenia Plates | 2.5 | 3.5 |
| Average | 1.8 | 2.8 |

TABLE PR3c

| | Mass Loss | |
|---|---|---|
| | 50 cycles Mass Loss (mg) | 100 cycles Mass Loss (mg) |
| Glasses | | |
| Michelangelo | 6 | 9 |
| Octime | 0.5 | 4.5 |
| Longchamp | 7 | 13 |
| RKG Kölsch | 0 | 9 |
| RKG Bier | 16 | 27 |
| Nachtmann Longdrink | 4 | 13 |
| Arcoroc Elegance | 4 | 8 |
| Sum | 37.5 | 83.5 |
| Decorated Glassware | | |
| Snoopy | 62 | 144 |
| Teddy | 20 | 43 |
| Kenia Plates | 29 | 87 |
| Sum | 111 | 274 |

A comparison of comparative Examples 1 and 2 shows that whilst the zinc containing glass is able to provide mass loss/ line corrosion protection for non-decorated glassware it provides a limited corrosion protection benefit for decorated glassware. This is particularly noticeable after 100 wash cycles.

Process Example 1

In this Example the following glass composition was used as a source of zinc and bismuth (as shown in Table PR4a) in addition to the base detergent tablet. The glass formulation used was in the form of a solid body (measuring 4 cm×1 cm×1 cm).

TABLE PR4a

| Component | Mole % |
| --- | --- |
| $P_2O_5$ | 53.0 |
| $K_2O$ | 25.5 |
| $Bi_2O_3$ | 1 |
| CaO | 1.7 |
| $Al_2O_3$ | 0.8 |
| ZnO | 18 |

When used in accordance with the method described above the mass loss of the glass block was on average 0.45 g/cycle, equating to about 45 mg $Zn^{2+}$ per cycle and about 15 mg $Bi^{3+}$.

The results are shown in Table PR4b (Glass Corrosion) and Table PR4c (Mass Loss).

TABLE PR4b

| | Glass Corrosion | | | |
| --- | --- | --- | --- | --- |
| | 50 cycles | | 100 Cycles | |
| Glasses | GC | CL | GC | CL |
| Michelangelo | 0.0 | 1.0 | 0.5 | 1.5 |
| Octime | 0.0 | 1.0 | 0.5 | 1.5 |
| Longchamp | 0.0 | 1.0 | 0.5 | 1.0 |
| RKG Kölsch | 0.0 | 1.0 | 1.0 | 1.0 |
| RKG Bier | 1.0 | 0.5 | 1.0 | 1.0 |
| Nachtmann Longdrink | 1.5 | 0.0 | 2.0 | 0.0 |
| Arcoroc Elegance | 1.0 | 0.5 | 1.5 | 1.0 |
| Average | 0.5 | 0.7 | 1.0 | 1.0 |
| Decorated Glassware | DS | | DS | |
| Snoopy | 0.5 | | 1.0 | |
| Teddy | 1.0 | | 1.5 | |
| Kenia Plates | 0.5 | | 1.0 | |
| Average | 0.7 | | 1.2 | |

TABLE PR4c

| | Mass Loss | |
| --- | --- | --- |
| | 50 cycles Mass Loss (mg) | 100 cycles Mass Loss (mg) |
| Glasses | | |
| Michelangelo | 0 | 3 |
| Octime | 1 | 1 |
| Longchamp | 0 | 5 |
| RKG Kölsch | 0 | 1.5 |
| RKG Bier | 0 | 4 |
| Nachtmann Longdrink | 4 | 8 |
| Arcoroc Elegance | 3 | 7 |
| Sum | 8.0 | 29.5 |

TABLE PR4c-continued

| | Mass Loss | |
| --- | --- | --- |
| | 50 cycles Mass Loss (mg) | 100 cycles Mass Loss (mg) |
| Decorated Glassware | | |
| Snoopy | 14 | 51 |
| Teddy | 1 | 14 |
| Kenia Plates | 9 | 34 |
| Sum | 24 | 99 |

Example 1 shows that a glass formulation containing a combination of zinc and bismuth, provides enhanced glassware corrosion protection (when compared to a formulation comprising simply zinc).

The enhanced glassware corrosion protection is achieved on both decorated and non-decorated glassware.

These effects are both unexpected.

The invention claimed is:

1. A water-soluble glass composition in the form of a solid body comprising 10 to 75 mole % $P_2O_5$, over 20 to 50 mole % alkali metal oxide, up to 40 mole % ZnO and, up to 40 mole % $Bi_2O_3$, the mole ratio of zinc to bismuth in the composition is in the range from 1:25 to 25:1 and wherein the composition is at least partially soluble in water and releases zinc and bismuth during a dishwashing cycle in an amount enough to ensure glassware corrosion protection without soiling the glassware.

2. A composition according to claim 1, wherein the composition comprises 25 to 40 mole %, of an alkali metal oxide.

3. A composition according to claim 2, wherein the alkali metal oxide is one or more of: $Li_2O$, $Na_2O$, $K_2O$.

4. A composition according claim 1, wherein the composition comprises less than 10 mole %, of an alkaline earth oxide.

5. A composition according to claim 4, wherein the alkaline earth oxide is calcium oxide (CaO).

6. A composition according to claim 1, wherein the composition comprises a refining agent.

7. A composition according to claim 6, wherein the refining agent comprises less than 10 mole % of the composition.

8. A composition according to claim 6, wherein the refining agent is a sulphate/oxide or antimony, arsenic, cerium, manganese or an admixture thereof.

9. A composition according to claim 1, wherein the composition comprises an oxide of an element from the group consisting of silicon, germanium, tin and lead.

10. A composition according to claim 9, wherein the amount of the silicon, germanium, tin or lead oxide is less than 10 mole %.

11. A composition according to claim 1, wherein the composition comprises an oxide of an element from the group consisting of gallium, aluminium and boron.

12. A composition according to claim 9, wherein the amount of the gallium, aluminium or boron oxide is preferably from 0.1 to 10 mole %.

13. A composition comprising:
from 41 to 54 mole % of $P_2O_5$,
from 20 to 30 mole % of alkali oxides,
up to 5 mole % of $SO_3$, from 15 to 25 mole % of ZnO,
from 0.2 to 1.5 mole % $Bi_2O_3$,
less than 3 mole % of alkaline-earth oxides, and, from 0.3 to 3 mole % of oxides of elements selected from the group consisting of silicon, aluminium and boron, and wherein the composition is at least partially soluble in water and releases zinc and bismuth during a dishwashing cycle in an amount enough to ensure glassware corrosion protection without soiling the glassware.

14. A composition according to claim 1, wherein the composition is in the form of a shaped body.

15. A composition according to claim 1, wherein the composition is in a comminuted form.

* * * * *